(12) United States Patent
Bender

(10) Patent No.: US 11,953,407 B2
(45) Date of Patent: Apr. 9, 2024

(54) LABORATORY SYSTEM PARTICULARLY FOR USE IN MICROSCOPY

(71) Applicant: LEICA MICROSYSTEMS CMS GMBH, Wetzlar (DE)

(72) Inventor: Claus Bender, Asslar-Werdorf (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 18 days.

(21) Appl. No.: 17/734,128

(22) Filed: May 2, 2022

(65) Prior Publication Data

US 2022/0349783 A1   Nov. 3, 2022

(30) Foreign Application Priority Data

May 3, 2021  (EP) .................................. 21171853

(51) Int. Cl.
| | | |
|---|---|---|
| *G01N 1/14* | (2006.01) | |
| *G02B 21/26* | (2006.01) | |
| *G01N 1/00* | (2006.01) | |
| *G01N 1/10* | (2006.01) | |

(52) U.S. Cl.
CPC .............. *G01N 1/14* (2013.01); *G02B 21/26* (2013.01); *G01N 2001/002* (2013.01); *G01N 2001/1062* (2013.01)

(58) Field of Classification Search
CPC .............. G01N 1/14; G01N 2001/002; G01N 2001/1062; G02B 21/26; G02B 21/33; B01L 2300/18; B01L 2400/0487; B01L 1/025; B01L 3/52; B01L 9/02

USPC ...... 73/863, 864.21–864.25, 864.81–864.84; 422/500, 566, 567; 312/209, 140.1, 312/140.2, 194, 237; 141/1–392

See application file for complete search history.

(56) References Cited

U.S. PATENT DOCUMENTS

| | | | |
|---|---|---|---|
| 1,581,502 A | * | 4/1926 | Wright .................. B08B 9/0839 134/52 |
| 7,765,868 B2 | | 8/2010 | Pirsch et al. |
| 2010/0027109 A1 | | 2/2010 | Liebel et al. |

(Continued)

FOREIGN PATENT DOCUMENTS

| | | | |
|---|---|---|---|
| CN | 104897675 A | * | 9/2015 |
| CN | 206342647 U | * | 7/2017 |

(Continued)

OTHER PUBLICATIONS

Nightsea, "Custom Microscope 'Dark Tent' Solves Workflow Challenges," Mar. 29, 2019, pp. 1-3, XP055949095, Nightsea, US.

*Primary Examiner* — Robert R Raevis

(74) *Attorney, Agent, or Firm* — Leydig, Voit & Mayer, Ltd.

(57) ABSTRACT

A laboratory system includes: a laboratory device on a table surface of a laboratory bench, the laboratory bench having at least one receiving section below the table surface, which at least one receiving section receives at least one fluid reservoir which is connected to the laboratory device. In an embodiment, the laboratory device includes a climate chamber and/or an incubation system, and the laboratory system further includes a first fluid supply system that supplies at least one fluid to the climate chamber and/or the incubation system, the first fluid supply system being connected to the at least one fluid reservoir in which the at least one fluid is storable.

12 Claims, 10 Drawing Sheets

(56) References Cited

U.S. PATENT DOCUMENTS

2011/0158865 A1    6/2011   Miller et al.
2014/0110202 A1*   4/2014   Vesterby .............. A45C 13/001
                                                        190/103

FOREIGN PATENT DOCUMENTS

| CN | 206652522 U | * | 11/2017 | | |
|----|-------------|---|---------|---|---|
| CN | 207899487 U | * | 9/2018 | | |
| CN | 110121549 A | * | 8/2019 | ............ | C12M 23/40 |
| CN | 212008055 U | * | 11/2020 | | |
| CN | 112620816 A | * | 4/2021 | | |
| JP | H082410 B2 | * | 1/1996 | | |

* cited by examiner

LABORATORY SYSTEM PARTICULARLY FOR USE IN MICROSCOPY

CROSS-REFERENCE TO PRIOR APPLICATION

Priority is claimed to European Patent Application No. EP 21171853.1, filed on May 3, 2021, the entire disclosure of which is hereby incorporated by reference herein.

FIELD

The present inventive concept relates generally to laboratory systems comprising a laboratory device which needs to be supplied with a fluid, particularly a liquid, and/or wherein a fluid, particularly a liquid, needs to be disposed of More particularly, the laboratory system may comprise a microscope having an immersion system for supplying and/or disposing of an immersion liquid, and/or using an incubation system for supplying and/or disposing of a fluid, particularly a gas and/or a liquid being a component of an incubation atmosphere in a sample chamber of the microscope.

BACKGROUND

Laboratory devices having e.g. a climate chamber are known, which climate chamber needs to be supplied with one or more fluids, particularly liquids, taken from a fluid reservoir, while used or worn fluid needs to be conducted back to another fluid reservoir. Such fluid reservoirs are typically placed next to the laboratory device and thus waste valuable space which could otherwise be used as workspace in the laboratory. Also, the tubes and hoses necessary for transporting the fluids tend to obstruct the workspace and are likely to be damaged or kinked.

An example of such a laboratory device, without loss of generality, includes a microscope comprising a climate chamber which itself forms or comprises a sample chamber for examining samples, particularly living samples like cells. In order to generate an incubation atmosphere in the sample chamber, the microscope may be connected to an incubation system. The incubation system provides an incubation atmosphere of a predetermined composition and/or of a predetermined temperature. Typically the $CO_2$-content, the humidity and the temperature of the incubation atmosphere are controlled. To this end, gasses and/or liquids have to be supplied to the incubation system.

Other examples relate to microscopes used for immersion microscopy where immersion liquid is supplied from a reservoir to the front lens of a microscope objective. Immersion liquids are typically water- or oil-based. For immersion with e.g. water objectives, water is usually drained from a water reservoir located somewhere inside or outside the microscope. Often, immersion microscopes having an incubated sample chamber are used.

SUMMARY

In an embodiment, the present invention provides a laboratory system, comprising: a laboratory device on a table surface of a laboratory bench, the laboratory bench having at least one receiving section below the table surface, which at least one receiving section is configured to receive at least one fluid reservoir which is connected to the laboratory device.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
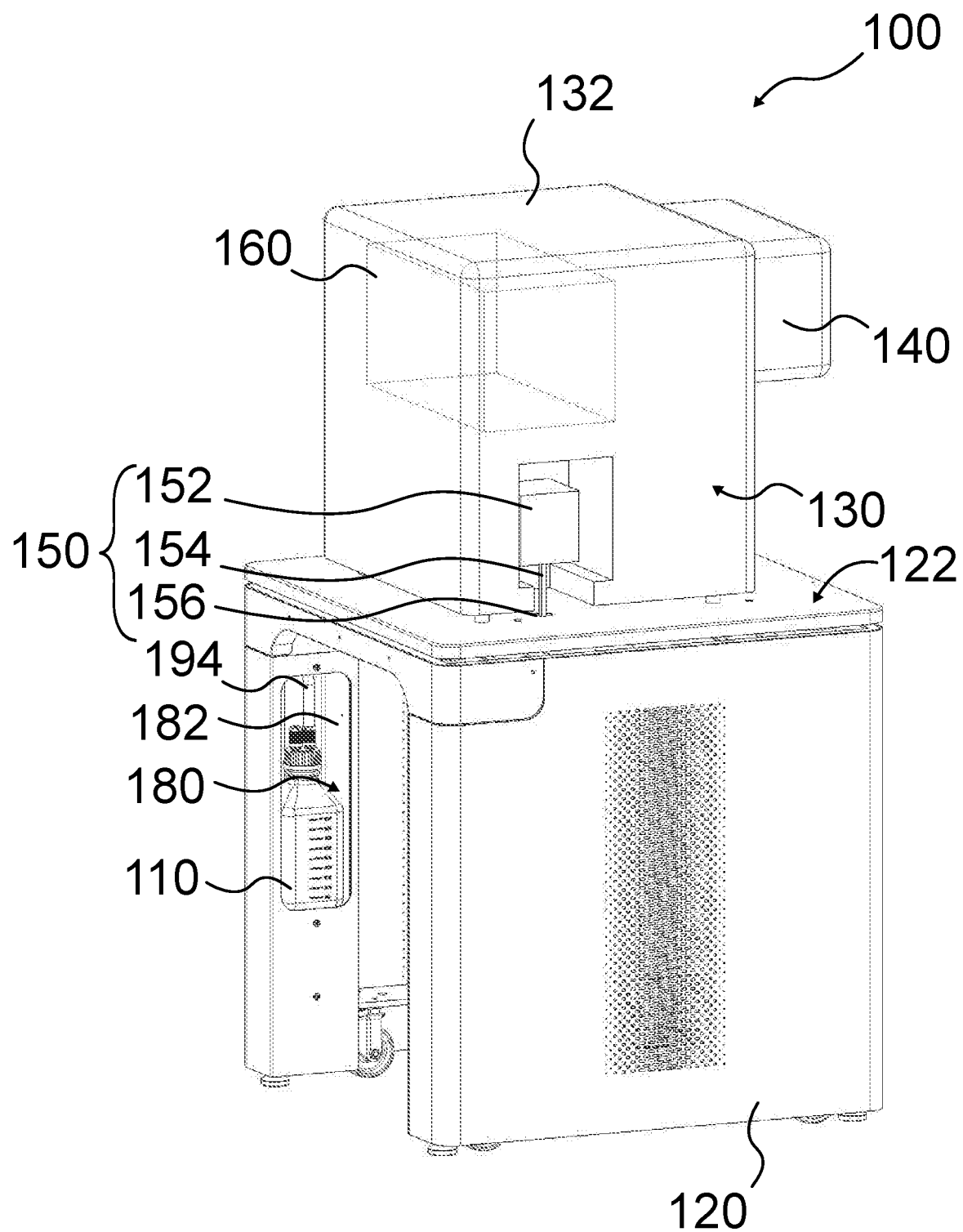
FIG. 1 schematically shows an embodiment of a laboratory system according to the present inventive concept, FIG. 2 schematically shows the embodiment of FIG. 1 as seen from another perspective, FIG. 3 schematically shows a more detailed view of a part of an embodiment of the present inventive concept shown in cross section, FIG. 4 schematically shows another part of an embodiment of the present inventive concept in more detail.

From the above described situation a need of an improved handling of such laboratory devices arouse. Particularly, safety requirements in a laboratory using such laboratory devices have to be fulfilled.

The present inventive concept provides an improved laboratory system as described herein, comprising a laboratory device placed on a table surface of a laboratory bench, the laboratory bench having at least one receiving section below the table surface of the laboratory bench, which receiving section is adapted to receive at least one fluid reservoir which is connected to the laboratory device. According to the present inventive concept, the at least one fluid reservoir does no longer need to be placed next to or into the laboratory device but can be "stowed away" below the table surface by putting it into the at least one receiving section adapted to receive one or more fluid reservoirs. Thus, valuable workspace which was formally absorbed by fluid reservoirs can now be freely used by an operator of the laboratory device. As the one or more receiving sections are part of the laboratory bench beneath the laboratory device, the footprint of the laboratory system is minimized. Further, an existing laboratory bench can be retrofitted to have the necessary one or more receiving sections for accommodating the at least one fluid reservoir.

The present inventive concept further allows a faster and safer operation of the laboratory device as the storage locations of the fluid reservoirs are predetermined, the fluid reservoirs in the receiving sections are protected from possible damage, tilting and falling over, the tubes and hoses can effectively be protected from damage or kinking, thus fulfilling work safety requirements.

Further advantages and embodiments of the present inventive concept are discussed in the following.

In a preferred embodiment, the laboratory device comprises a climate chamber and/or an incubation system. Examples of a climate chamber and of an incubation system are discussed above in connection with a microscope used as at least a part of a laboratory device. In this embodiment, the laboratory system further comprises a first fluid supply system that supplies at least one fluid to the climate chamber and/or the incubation system, the fluid supply system being connected to the at least one fluid reservoir in which said at least one fluid is storable. For instance, if the laboratory system comprises a microscope and an incubation system, the climate camber may be an integrated climate chamber integrated into the microscope. The climate chamber may form or comprise a sample chamber of the microscope (incubated sample chamber) or form a small chamber including a microenvironment around most of the topside of the sample itself (stagetop incubator). In order to generate an incubation atmosphere in the climate chamber, the microscope is connected to the incubation system. The incubation system provides an incubation atmosphere of a predetermined composition and/or of a predetermined temperature. Typically, the $CO_2$-content, the humidity and the temperature of the incubation atmosphere are controlled. To this end, gasses and/or liquids have to be supplied to the incubation system and/or to the climate chamber itself.

Preferably, the first fluid supply system comprises one or more fluid pumps and tubes for conducting a fluid (which is a liquid and/or a gas) to the climate chamber and/or to the incubation system. Examples of such fluids are water, carbon dioxide or nitrogen. Water is typically used to generate an incubation atmosphere of predefined humidity. Carbon dioxide or nitrogen serve the purpose of adjusting the $CO_2$ content of the atmosphere. The fluid supply system is connected to the fluid reservoir or to each of the fluid reservoirs for supplying the fluid(s) to the climate chamber and/or to the incubation system. In order to minimize the footprint of the laboratory system, the first fluid supply system is advantageously, as far as possible, integrated into the laboratory device and/or the laboratory bench. Examples will be discussed further below, also in connection with the figures.

Apart from one or more fluid/liquid pumps and tubes/hoses, the first fluid supply system may comprise one or more feedthroughs for said tubes/hoses (the term "hose" can be regarded interchangeable with "tube"). Such feedthroughs help integrate the tubes into the laboratory device and/or laboratory bench, thus avoiding an external laying of flexible tubes and hoses outside of the laboratory bench and/or the laboratory device.

In this context, it is advantageous if said at least one fluid pump is arranged at or in the laboratory bench, at or in the incubation system, at or in the laboratory device, and/or at or in the climate chamber. This also helps minimize the footprint of the system.

In a preferred embodiment, the laboratory device comprises a microscope with at least one immersion objective, and the laboratory system further comprises a second fluid supply system that supplies an immersion fluid to the immersion objective, the second fluid supply system being connected to the at least one fluid reservoir in which said immersion fluid is storable. Immersion fluid typically is an immersion liquid which is supplied from an immersion liquid reservoir to the front lens of the microscope objective. Immersion liquids are typically water- or oil-based. Often, immersion microscopes having a climate chamber are used for inspection of living cells (see embodiment described above).

Thus, in the embodiment of an immersion microscope, without restriction to generality, liquids are considered as an example of the general term "fluid" unless otherwise specified. The second fluid/liquid supply system typically comprising one or more fluid pumps and tubes for conducting the immersion liquid(s), supplies one or more immersion liquids to the immersion objective. Again, in order to minimize the footprint of the laboratory system, the second fluid/liquid supply system is advantageously, as far as possible, integrated into the laboratory device and/or the laboratory bench. Examples will be discussed further below, also in connection with the figures.

Apart from one or more fluid/liquid pumps and tubes/hoses, also the second fluid supply system may comprise one or more feedthroughs for said tubes/hoses (the term "hose" can be regarded interchangeable with "tube"). Such feedthroughs help integrate the tubes into the laboratory device and/or laboratory bench, thus avoiding an external laying of flexible tubes and hoses outside of the laboratory bench and/or the laboratory device.

In this context, it is advantageous if said at least one fluid pump is arranged at or in the laboratory bench and/or at or in the laboratory device/microscope. This also helps minimize the footprint of the system.

In an embodiment, the at least one receiving section comprises at least one of one or more receptacle compartments, one or more name tags, and one or more retainer portions. The receptacle compartment is adapted to receive a fluid reservoir, it may also be advantageous if a receptacle compartment is adapted to receive two or more fluid reservoirs. Name tags can be used to indicate the kind of fluid(s)/liquid(s) which is or are stored in the respective receptacle compartment. A retainer portion is suitable to avoid tilting and particularly dropping out of a fluid/liquid reservoir out of the receptacle compartment.

The at least one receiving section of the laboratory system may particularly be in the form of a rack which is integrated into the laboratory bench. The at least one receiving section may also be integrated into one or more bench legs or form at least a part of one or more bench legs of the laboratory bench. Again, these embodiments help minimize the footprint of the system and allow a compact design of the laboratory system.

As already discussed above, the liquid supply system preferably comprises at least one feedthrough which is arranged in adjacent sections of the laboratory bench and the laboratory device. Such a feedthrough allows an optimal connection of the laboratory device with a fluid reservoir minimizing tube lengths and avoiding external tube laying.

As already indicated in the introductory part of the present description, a preferred embodiment of the laboratory device is a microscope. The microscope preferably comprises a climate chamber which comprises or represents a sample chamber for accommodating a sample to be examined by the microscope. Furthermore, the microscope may be connected to an incubation system, which is then another part of the laboratory device, for providing incubation atmosphere into the sample chamber/climate chamber of the microscope. Alternatively, the microscope itself comprises an (integrated) incubation system.

As used herein, the term "and/or" includes any and all combinations of one or more of the associated listed items and may be abbreviated as "/".

It should be noted that the above features of the embodiments according to the inventive concept can—wholly or in part—be combined to achieve other embodiments still falling under the scope of the present inventive concept as defined in the appended claims.

Further embodiments and advantages of the present inventive concept are described below in connection with the following figures.

In the following, the figures are described comprehensively, same reference signs designating same or at least structurally identical components.

FIG. 1 schematically shows an embodiment of the present inventive concept in a perspective view from the right, the laboratory system 100 comprising a laboratory device 130 placed on a table surface 122 of a laboratory bench 120. The laboratory bench 120 comprises a receiving section 180 adapted to receive one liquid reservoir 110 which is connected to the laboratory device 130 for supplying liquid to the laboratory device 130 and/or for disposing of a liquid from the laboratory device 130.

In the following, the laboratory device 130 comprises a microscope 132 and an incubation system 140 for producing an incubation atmosphere inside the climate chamber 160 of the microscope 132.

As can be seen from FIG. 1, the microscope 132 is connected to the incubation system 140. The incubation system 140 provides an incubation atmosphere of a predetermined $CO_2$-content, a predefined humidity and temperature into the climate chamber 160 of the microscope 132. To this end, the incubation system 140 and/or the climate chamber 160 have to be supplied with a fluid, particularly a liquid and/or a gas.

On the other hand, the microscope 132 of FIG. 1 is configured as an immersion microscope having an immersion objective. Typically, the immersion objective is part of an inverted microscope and thus located beneath the sample to be examined, i.e. below the climate chamber 160.

In the present embodiment of FIG. 1, the liquid reservoir 110 is a bottle storing an incubation liquid, i.e. a liquid used for generating an incubation atmosphere, particularly water.

Bottle 110 as shown in FIG. 1 is placed in a receptacle compartment 182 and is connected to a flexible tube 194. This tube 194 is laid beneath the table top of the laboratory bench 120 and from there led to the incubation system 140 (see FIG. 2).

Figure 2:
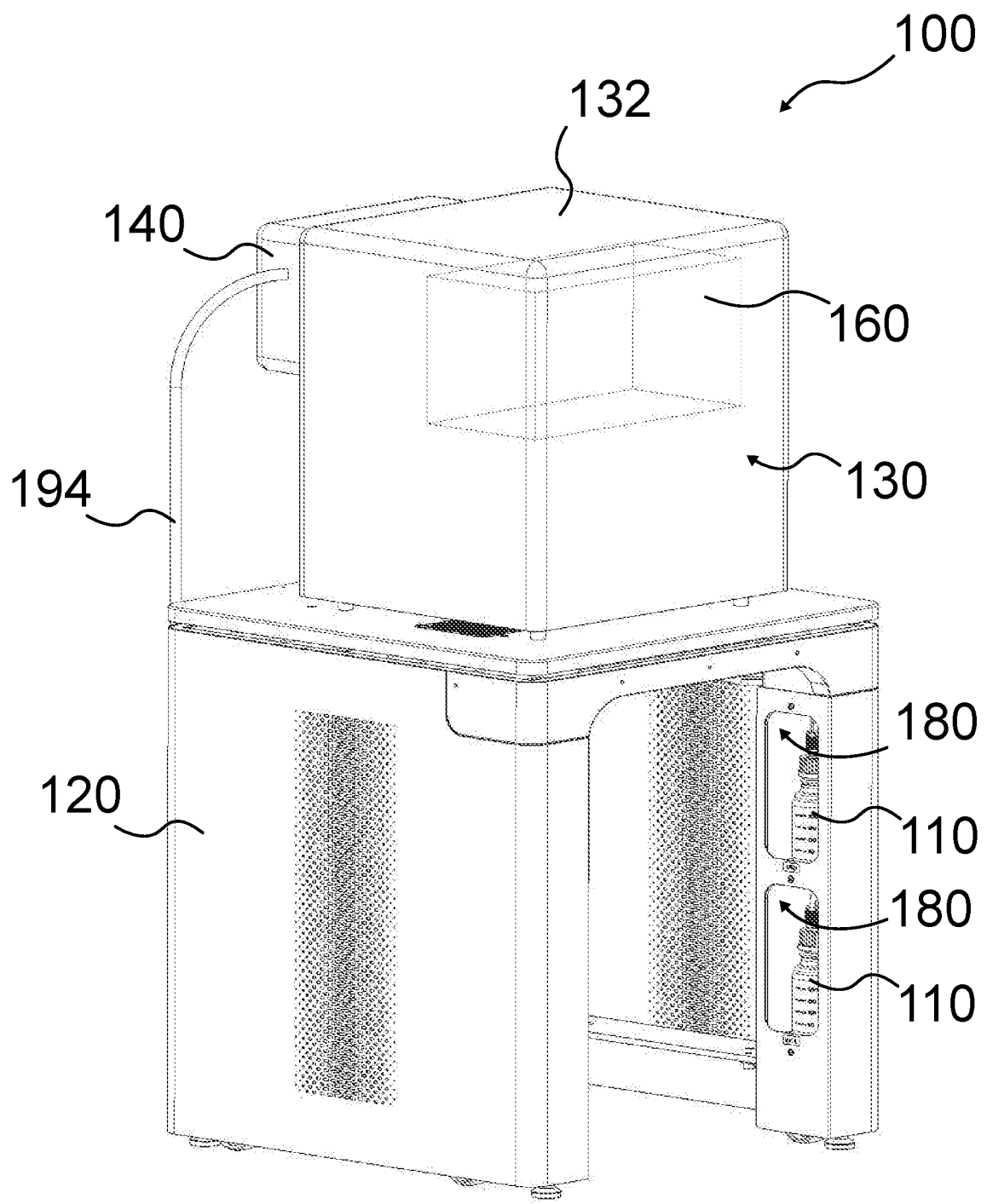

The bottles 110 shown in FIG. 2 are placed in corresponding receiving sections 180 and connected to tubes 154, which are led through one or more feedthroughs 156 to the liquid pump 152 as shown in FIG. 1. Liquid pump 152, feedthroughs 156 and tubes 154 together form a second/immersion liquid supply system 150 as designated in FIG. 1. The liquid pump 152 supplies immersion liquid to the immersion objective of the microscope 132.

As becomes clearer from the perspective shown in FIG. 2, bottle 110 as shown in FIG. 1 is connected via a flexible tube/hose 194 as also shown in FIG. 2 with the incubation system 140. On the other hand, the two bottles 110 shown in FIG. 2 are connected with fluid pump 152 via tubes 154 shown in FIG. 1. In this way, the tube lengths can be kept as short as possible. However, also different connections may be reasonable depending on the specific application.

As shown in FIGS. 1 and 2, the receiving sections 180 are built in racks which are integrated into two bench legs, opposite one another, of the laboratory bench 120. This results in a laboratory system 100 of a very small footprint, the little and thus valuable workspace is not absorbed by fluid reservoirs, and the tubes 154, 194 are protected from damage and kinking such that work safety requirements can be fulfilled.

Another liquid/fluid pump can be part of the first fluid supply system 190 connected to or integrated into the incubation system 140 and/or the climate chamber 160 as will be further discussed below. Pump 152, in this embodiment, is arranged at the laboratory device 130, more exactly, in a recess of the laboratory device 130 or microscope 132.

Figure 3:
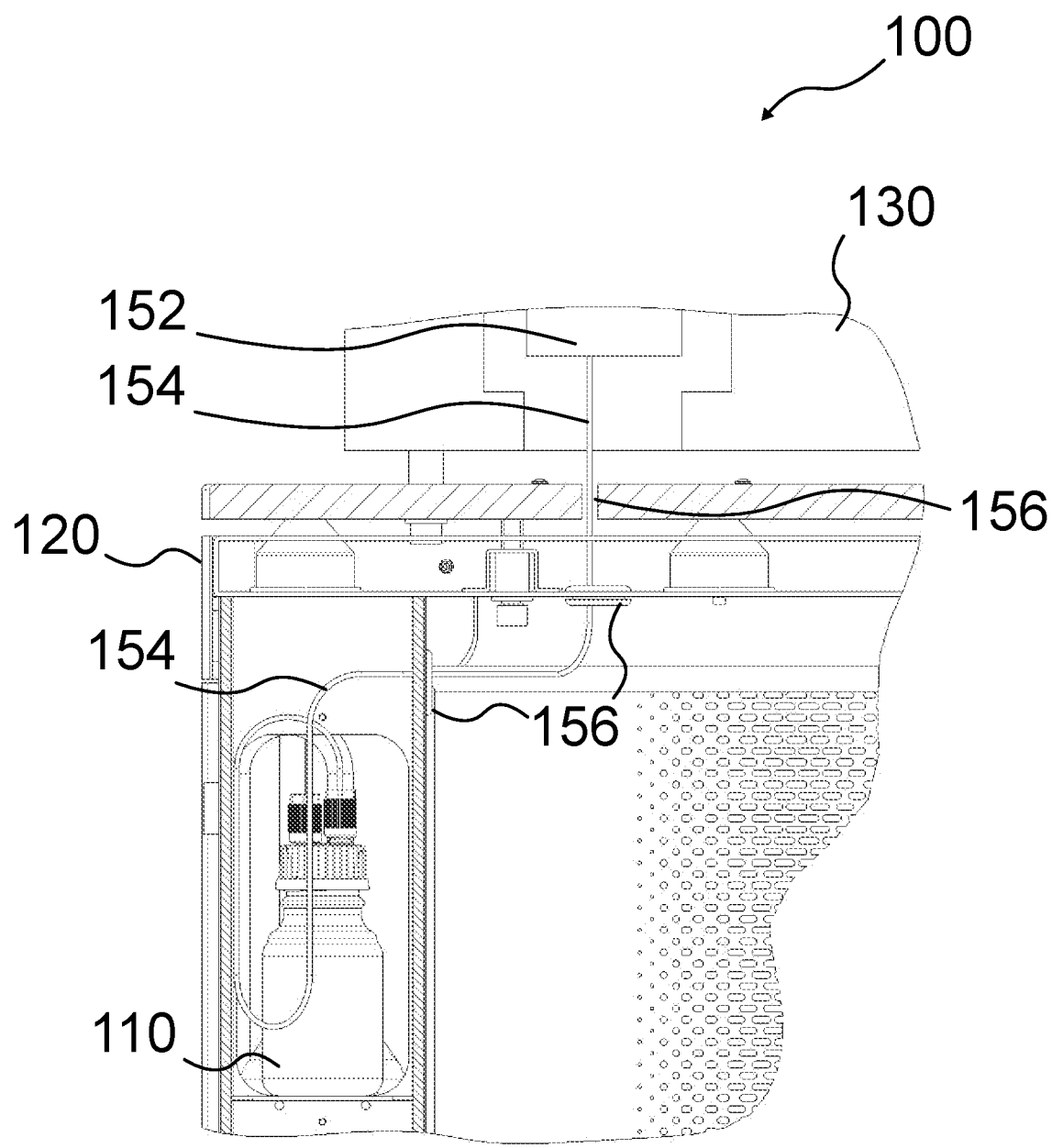

FIG. 3 shows the tube layout of the one or more tubes 154 to the liquid pump 152 in more detail. Tube 154 is led from the bottle 110 through a number of feedthroughs 156 in order to exit the laboratory bench 120 underneath the laboratory device 130. This tube layout ensures that tube 154 does not obstruct the workspace of the laboratory system and is not damaged or kinked.

Figure 4:
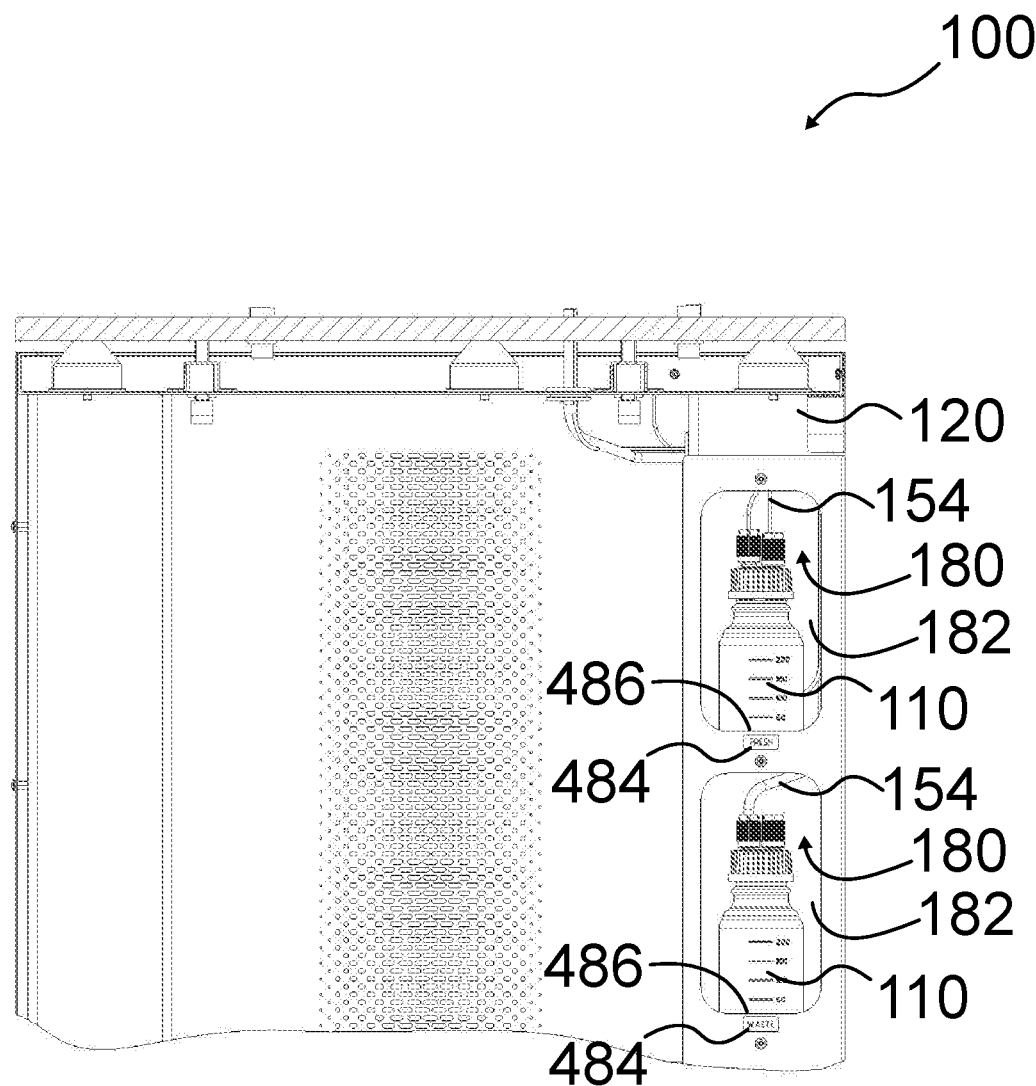

FIG. 4 shows another detailed view on two bottles 110 placed in respective receiving sections 180, one on top of the other. As can be seen from FIG. 4, each receiving section 180 comprises a receptacle compartment 182, a name tag 484 and a retainer portion 486. In this embodiment, the name tags indicate whether the liquid in the bottle 110 is "fresh" or "waste". The retainer portions 486 ensure that the bottles 110 are stored safely and that tilting or dropping out of a bottle 110 out of the compartment 182 is avoided. Further, each bottle 110 has an indicator of the fluid level. While (immersion) liquid is conducted from the upper bottle 110 containing "fresh" liquid through tube 154 to the immersion objective of the microscope 132, used liquid or "waste" (immersion) liquid is disposed of the immersion objective and returned through another tube 154 to the lower bottle 110 as shown in FIG. 4.

Figure 5:
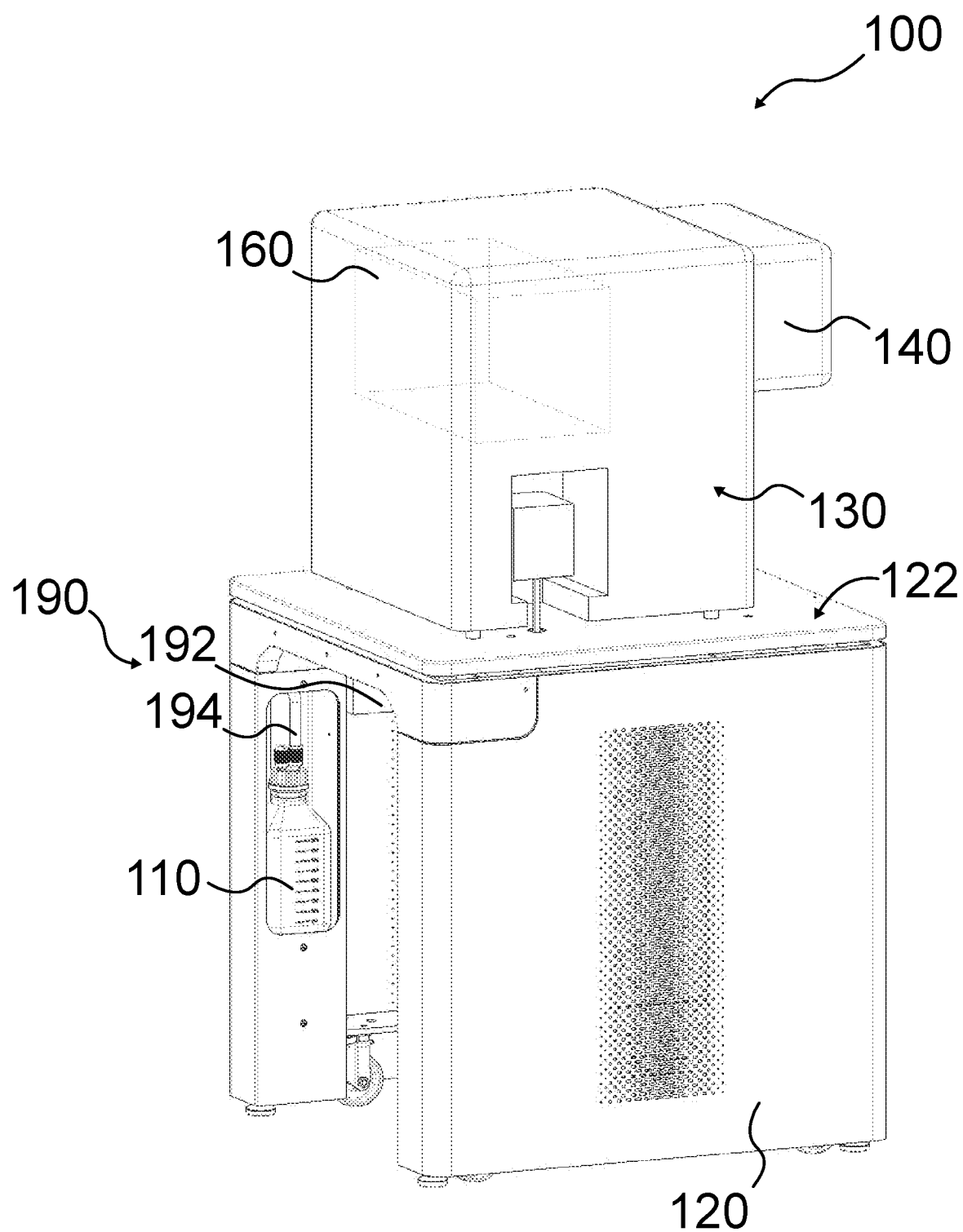
FIGS. 5 and 6 show another embodiment of a laboratory system.
Figure 6:
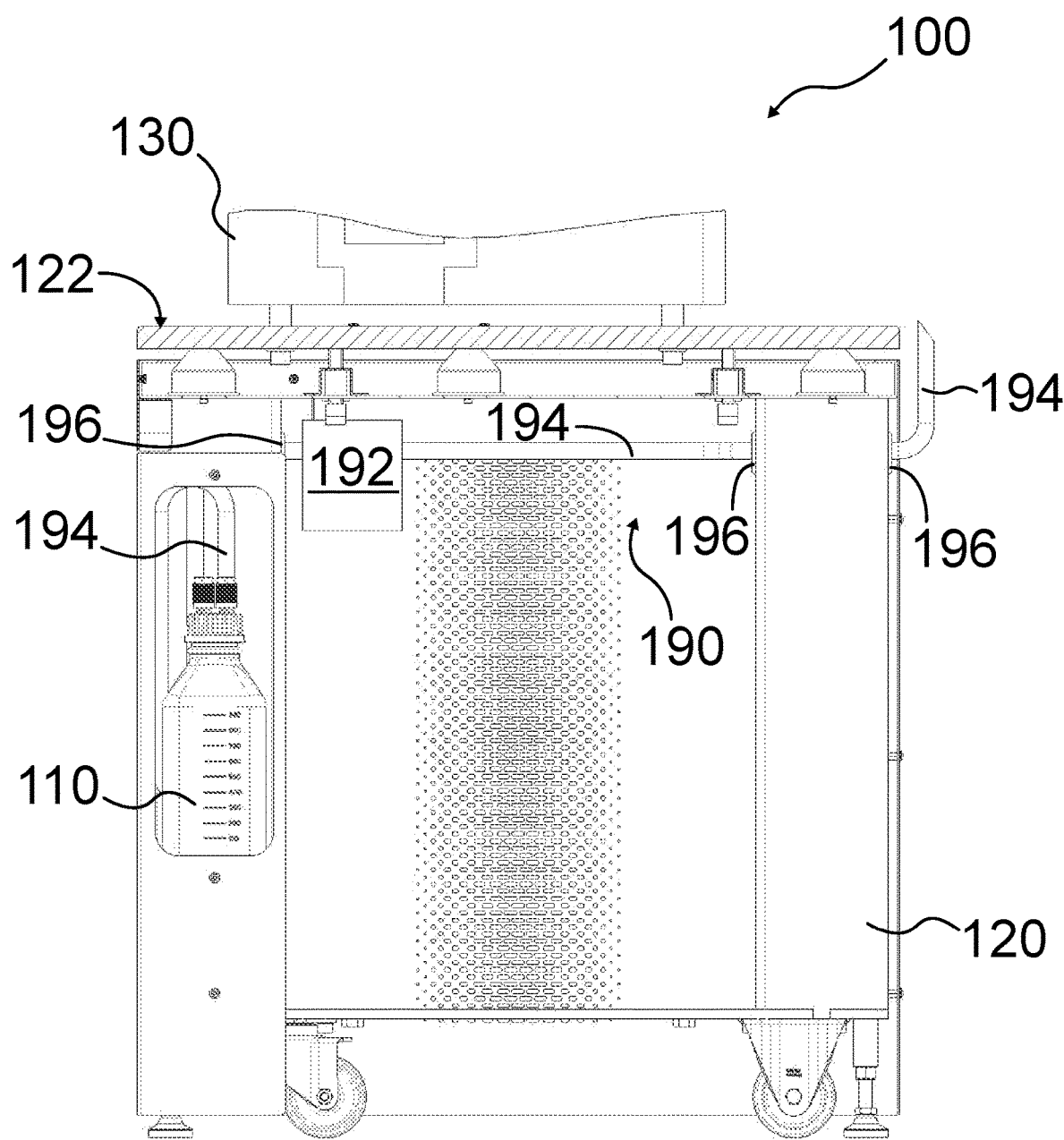

FIGS. 5 and 6 show another embodiment of a laboratory system 100 comprising a laboratory device 130, the laboratory device 130 comprising a climate chamber 160 and an incubation system 140. The laboratory device 130 is placed on a table surface 122 of a laboratory bench 120. FIGS. 5 and 6 illustrate in more detail a possible implementation of a first fluid supply system 190 for supplying at least one fluid to the climate chamber 160 and/or the incubation system 140. A fluid reservoir/bottle 110 is connected via a flexible tube 194 and a fluid pump 192 to the incubation system 140. A number of feedthroughs 196 is provided inside the laboratory bench 120 in order to avoid a tube laying outside of the laboratory bench 120 and in order to keep the tube lengths as short as possible. Pump 192 is arranged below the table top of the laboratory bench 120 and is configured to drain a liquid/water from bottle 110 and conduct it to the incubation system 140. Typically, water is used as the liquid such that the incubation system 140 is able to control a predetermined humidity inside the climate chamber 160.

Figure 7:
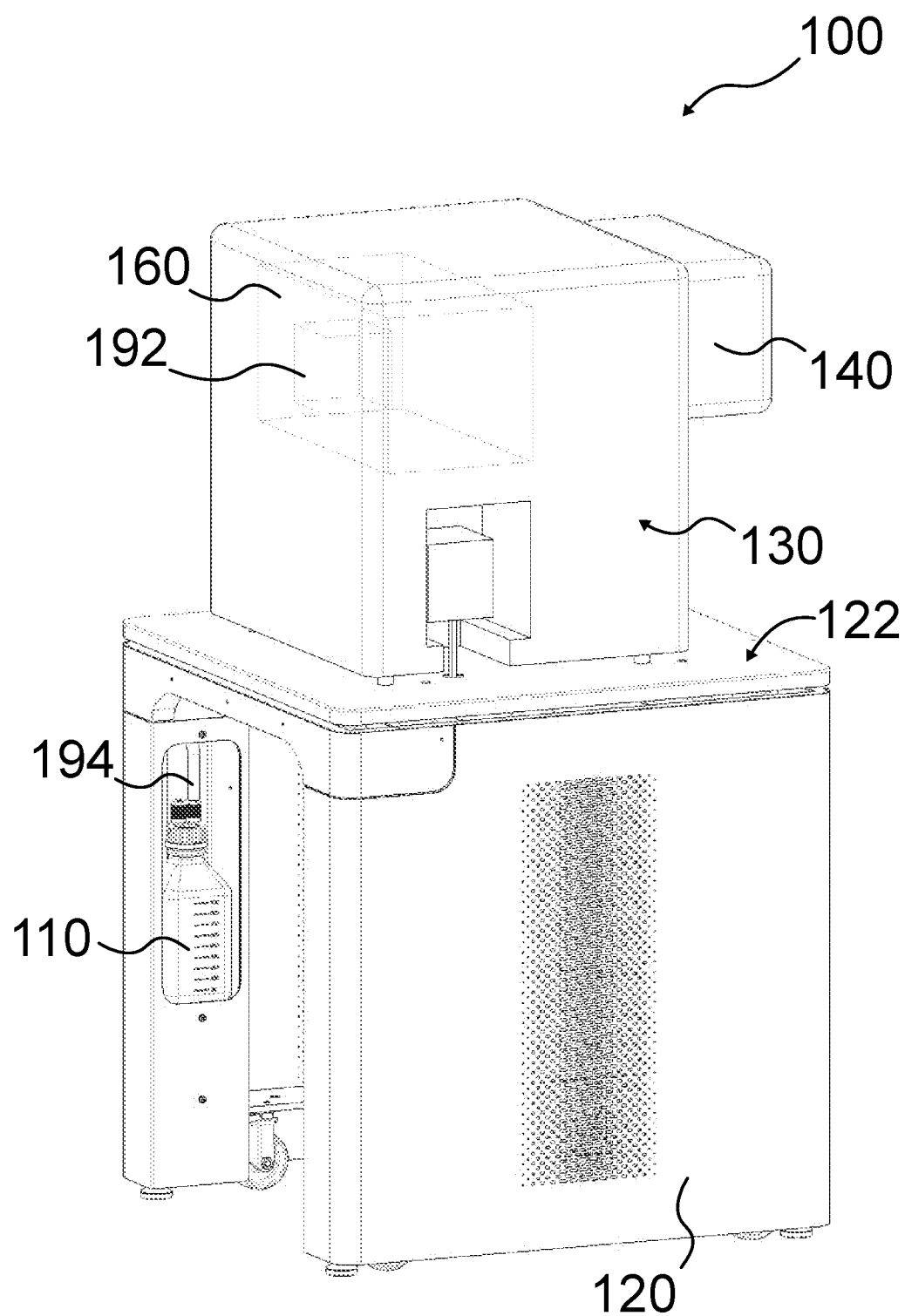
FIGS. 7 and 8 show yet another embodiment of a laboratory system.
Figure 8:
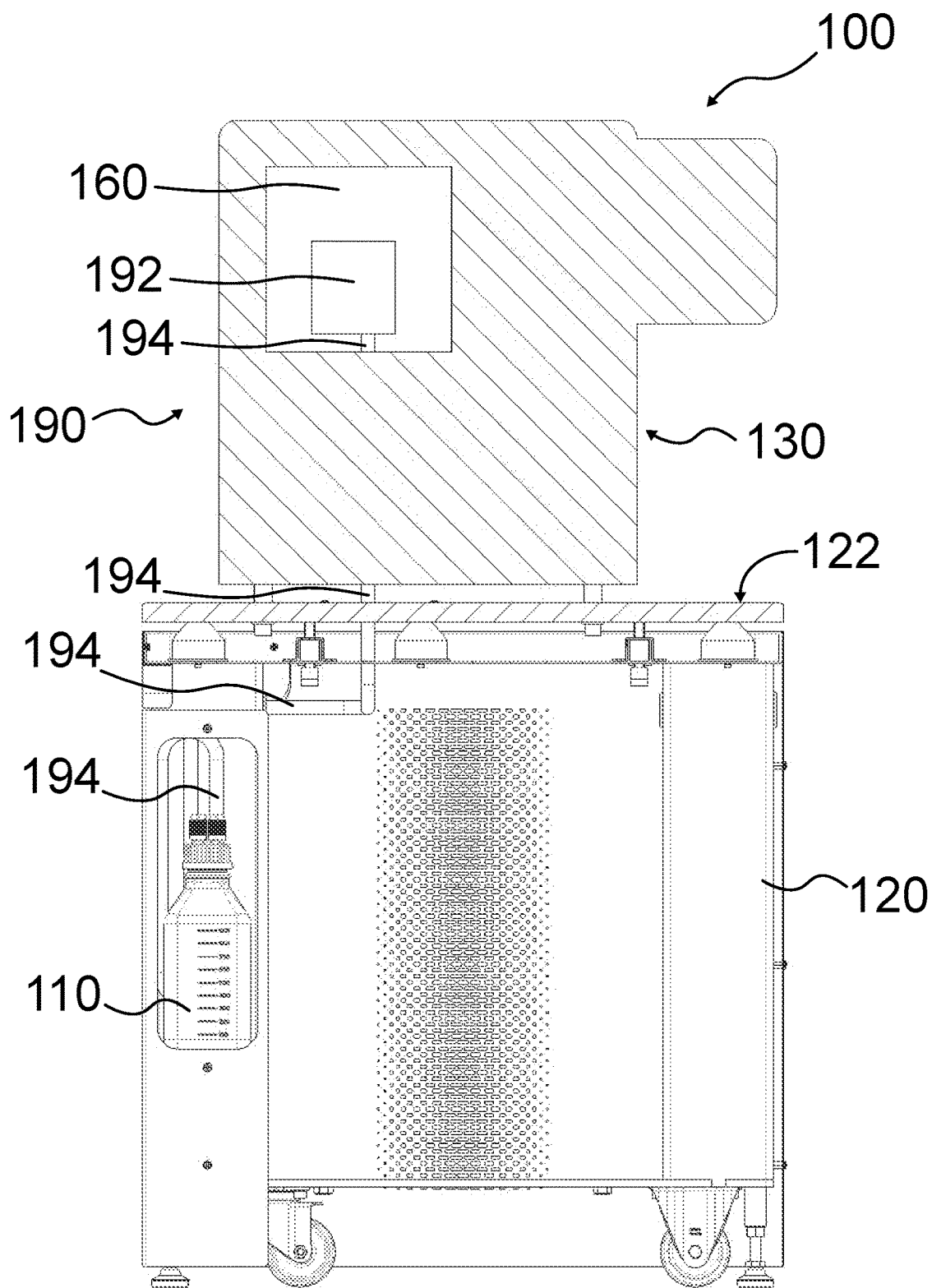

FIGS. 7 and 8 show yet another embodiment of a laboratory system 100 similar to that of FIGS. 5 and 6. Thus, only the difference to the embodiment of FIGS. 5 and 6 will be discussed here. As can be seen from FIGS. 7 and 8, the pump 192 for pumping an incubation fluid like water from bottle 110 is arranged inside the climate chamber 160. As can be seen from FIG. 8, the feed tube 192 passes through the inside of the laboratory bench 120 and further through the table surface 122 of the laboratory bench 120 and inside the laboratory device 130 or microscope 132 into the climate chamber 160. The corresponding feedthroughs are not shown in FIGS. 7 and 8. The incubation fluid pump 192 can further include or be connected to a vaporizer for supplying water vapour into the climate chamber 160. Alternatively, the pump 192 may be integrated into the incubation system 140.

Figure 9:
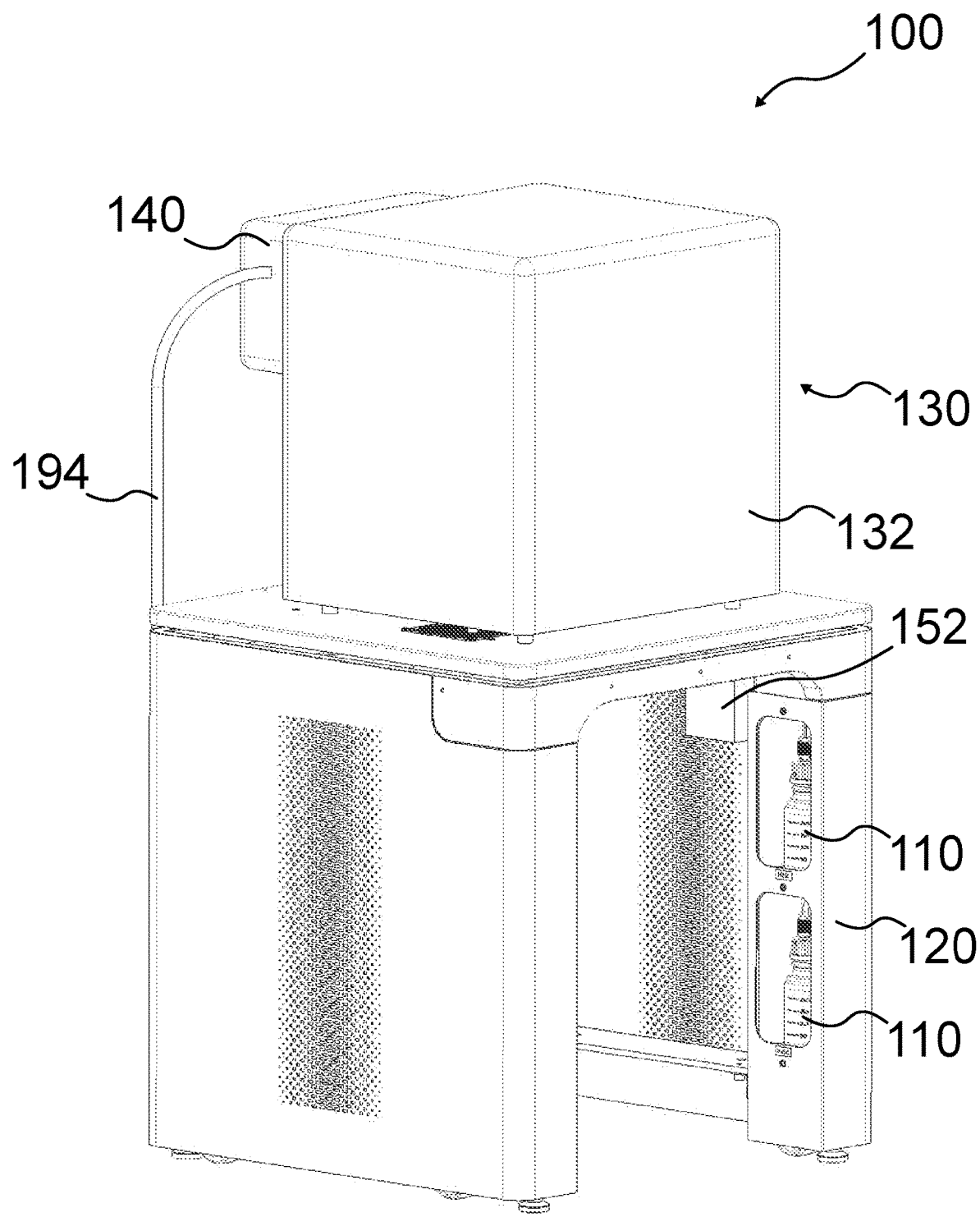
FIGS. 9 and 10 show yet another embodiment of a laboratory system according to the present inventive concept.
Figure 10:
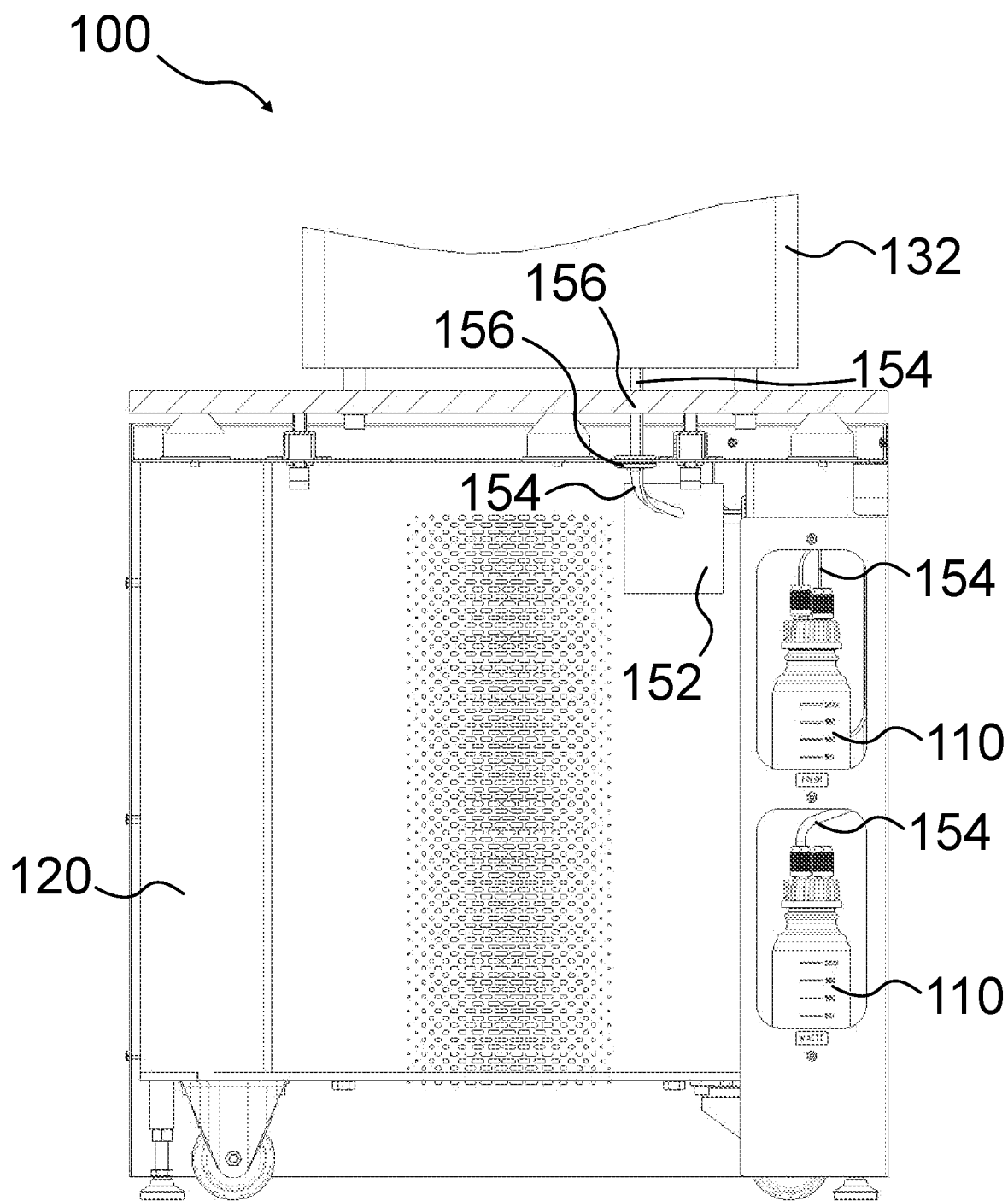

FIGS. 9 and 10 show another embodiment of a laboratory system 100 with an alternative arrangement of a pump 152 of the second fluid supply system 150. As shown in FIG. 9, the immersion liquid pump 152 in this embodiment is arranged at the laboratory bench 120 beneath the table top of the laboratory bench 120 next to the bottles 110. As can be seen from FIG. 10, the feed tube 154 from the upper bottle 110 provides fresh water/immersion liquid through the pump 152 and through the further tube 154 inside the microscope 132 to an immersion objective of the microscope 132. Waste water/immersion liquid is returned to the lower bottle 110. Again, feedthroughs are depicted 156.

It should be noted that the above embodiments according to FIGS. 1 to 10 are not limited to the very specification described herein but elements of different figures/embodiments can be combined to a new embodiment which are not explicitly shown in the figures but still being covered by the present inventive concept as defined in the appended claims. For example, an arrangement shown in respect of an immersion liquid supply can also be used for an incubation atmosphere supply and vice versa.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 laboratory system
110 fluid reservoir
120 laboratory bench
122 table surface
130 laboratory device
132 microscope
140 incubation system
150 second fluid supply system
152 fluid pump
154 tube
156 feedthrough
160 climate chamber, sample chamber
180 receiving section
182 receptacle compartment
190 first fluid supply system
192 fluid pump
194 tube
196 feed through
484 name tag
486 retainer portion

What is claimed is:

1. A laboratory system, comprising:
a laboratory device on a table surface of a laboratory bench, the laboratory bench having at least one receiving section below the table surface, which at least one receiving section is configured to receive at least one fluid reservoir which is connected to the laboratory device,
wherein the laboratory device comprises a climate chamber and/or an incubation system,
wherein the laboratory system further comprises a first fluid supply system configured to supply at least one fluid from the at least one fluid reservoir to the climate chamber and/or the incubation system, and
wherein the laboratory device comprises a microscope.

2. The laboratory system of claim 1, wherein the at least one receiving section comprises at least one of one or more receptacle compartments, one or more name tags, and one or more retainer portions.

3. The laboratory system of claim 1, wherein the at least one receiving section comprises a rack integrated in the laboratory bench.

4. The laboratory system of claim 1, wherein the at least one receiving section is integrated into one or more bench legs or forms at least a part of one or more bench legs of the laboratory bench.

5. The laboratory system of claim 1, wherein the laboratory device comprises the climate chamber, which comprises a sample chamber configured to accommodate a sample to be examined by the microscope.

6. The laboratory system of claim 5, wherein the laboratory device comprises the incubation system, and
wherein the microscope is connected to the incubation system so as to provide an incubation atmosphere to the sample chamber of the microscope.

7. A laboratory system, comprising:
a laboratory device on a table surface of a laboratory bench, the laboratory bench having at least two receiving sections below the table surface, receiving section being configured to receive at least one a fluid reservoir which is connected to the laboratory device,
wherein the laboratory device comprises a climate chamber and/or an incubation system,
wherein the laboratory system further comprises a first fluid supply system configured to supply a first fluid from a first fluid reservoir to the climate chamber and/or the incubation system,
wherein the laboratory device comprises a microscope with at least one immersion objective, and
wherein the laboratory system further comprises a second fluid supply system configured to supply an immersion fluid to the at least one immersion objective, the second fluid supply system being connected to a second fluid reservoir in which the immersion fluid is storable.

8. The laboratory system of claim 7, wherein the second fluid supply system comprises at least one of one or more fluid pumps, one or more tubes, and one or more feedthroughs for the one or more tubes.

9. The laboratory system of claim 8, wherein the one or more fluid pumps comprises at least one fluid pump, the at least one fluid pump being arranged at least one of at the laboratory bench and at or in the laboratory device.

10. The laboratory system of claim 7, wherein the first or second fluid supply system comprises at least one feedthrough, and
wherein at least one feedthrough of the at least one feedthrough is arranged in adjacent sections of the laboratory bench and the laboratory device.

11. A laboratory system, comprising:
a laboratory device on a table surface of a laboratory bench, the laboratory bench having at least one receiving section below the table surface, which at least one receiving section is configured to receive at least one fluid reservoir which is connected to the laboratory device, wherein the laboratory device comprises a climate chamber and/or an incubation system, wherein the laboratory system further comprises a first fluid supply system configured to supply at least one fluid from the at least one fluid reservoir to the climate chamber and/or the incubation system, wherein the laboratory device comprises a microscope, and wherein the first fluid supply system comprises at least one of one or more fluid pumps, one or more tubes, and one or more feedthroughs for the one or more tubes.

12. The laboratory system of claim 11, wherein the one or more fluid pumps comprises at least one fluid pump, the at least one fluid pump being arranged at least one of at the laboratory bench, at or in the incubation system, at or in the laboratory device, and at or in the climate chamber.

\* \* \* \* \*